US006440307B1

(12) United States Patent
Philip et al.

(10) Patent No.: US 6,440,307 B1
(45) Date of Patent: Aug. 27, 2002

(54) RETAINING FILTER, PLANT AND METHOD FOR TREATING EFFLUENTS

(75) Inventors: Hervé Philip, Pignan (FR); Siegfried Maunoir, Palavas (FR)

(73) Assignee: Epcaro, Societe Anonyme, Paris (FR)

( * ) Notice: Subject to any disclaimer, the term of this patent is extended or adjusted under 35 U.S.C. 154(b) by 0 days.

(21) Appl. No.: 09/125,739

(22) PCT Filed: Feb. 21, 1997

(86) PCT No.: PCT/FR97/00326

§ 371 (c)(1),
(2), (4) Date: May 17, 1999

(87) PCT Pub. No.: WO97/30770

PCT Pub. Date: Aug. 28, 1997

(30) Foreign Application Priority Data

Feb. 23, 1996 (FR) .............................................. 96 02276

(51) Int. Cl.$^7$ .................................................. C02F 3/00
(52) U.S. Cl. ........................ 210/617; 210/283; 210/263; 210/532.2
(58) Field of Search ................................ 210/617, 263, 210/283, 532.2

(56) References Cited

U.S. PATENT DOCUMENTS

| 4,251,359 A | * | 2/1981 | Colwell |
| 4,826,601 A | * | 5/1989 | Spratt |
| 5,707,513 A | * | 1/1998 | Jowett |

FOREIGN PATENT DOCUMENTS

| EP | 0 046 276 A1 | 8/1981 | ............. C02F/1/40 |
| EP | 0 240 412 A1 | 3/1987 | ............. E03F/11/00 |
| EP | 0 672 440 A1 | 3/1995 | ........... B01D/24/38 |
| FR | 2 322 833 | 8/1976 | ............. C02C/5/06 |

OTHER PUBLICATIONS

Normalisation francaise; P 16–603 Dec. 1992; Reference DTU 64.1; Mise en oeuvre des dispositifs d'assainissement autonome; afnor 1992.

1207A Journal A; vol. 20, No. 2 (Apr. 1979); Control of the Surface–Water Purification Plant for the Amsterdam Water-–Supply Authority (*).

* cited by examiner

Primary Examiner—Chester T. Barry
(74) Attorney, Agent, or Firm—Nawrocki, Rooney & Sivertson, P.A.

(57) ABSTRACT

A water treatment facility and method for treating effluents incorporating an input filter for removing bacterial contamination. The filter utilizes pipe and tube systems for distribution and drainage, which extend from both the inlet and outlets, which face each other at a spaced distance, and contain lengthwise perforations with filtration equipment therebetween. The water treatment apparatus utilizes a septic tank which includes a barrier, a waste water delivery pipe, an evacuation pipe for clean water, equipment for decantation of the heaviest matter at the bottom of the barrier and the surface accumulation of grease and light particles, anaerobic fermentation of the entrapped material, and protective equipment arranged to prevent plugging.

35 Claims, 5 Drawing Sheets

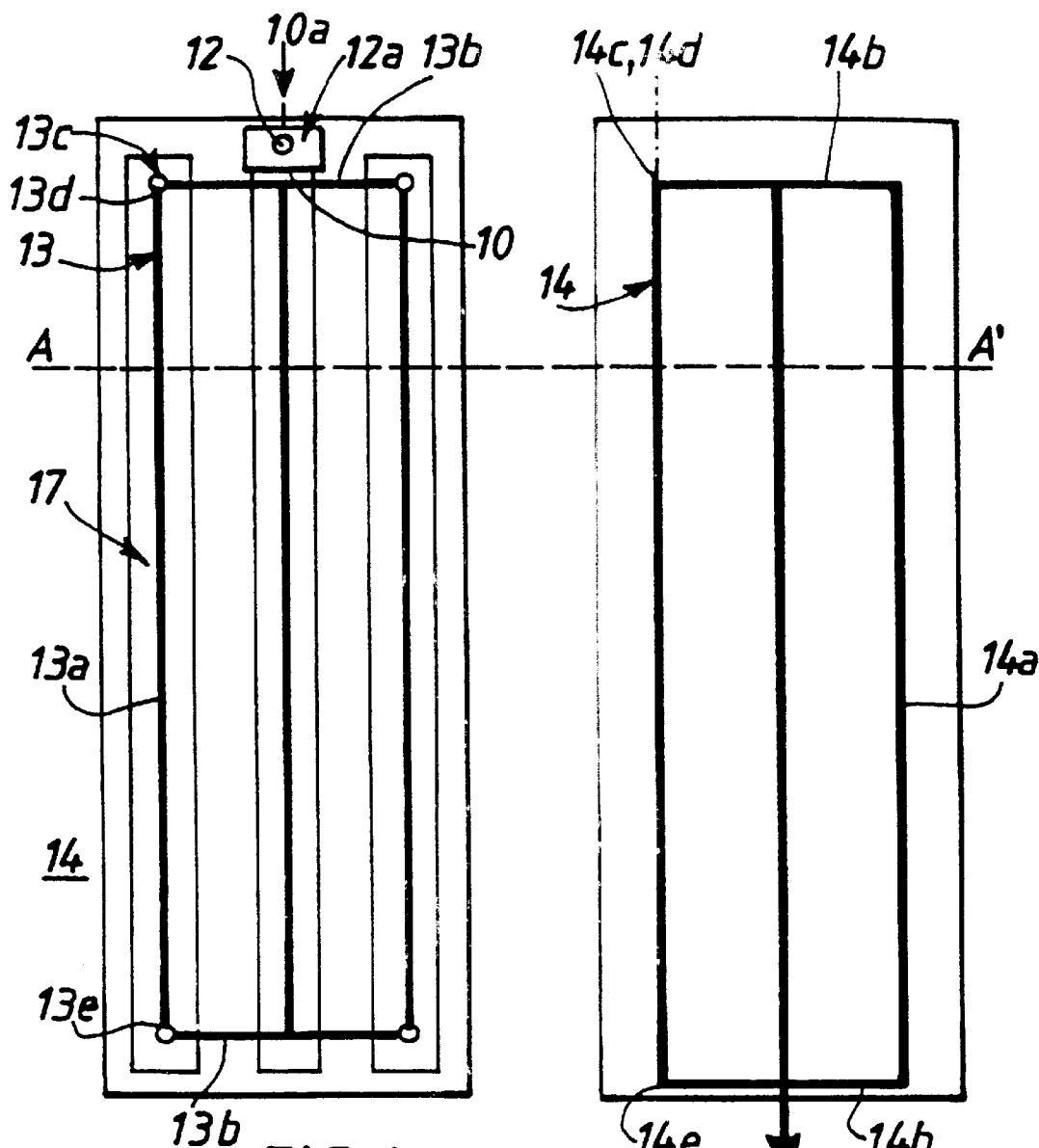
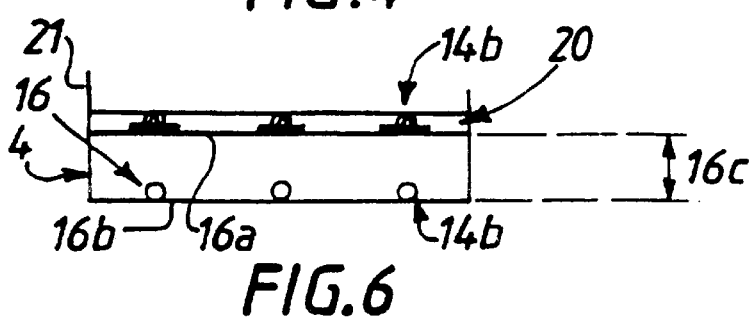

RETAINING FILTER, PLANT AND METHOD FOR TREATING EFFLUENTS

The present invention deals with a filter for removing bacterial contamination, and, a facility and treatment method for liquid waste filtration.

BACKGROUND OF THE INVENTION

Field of the Invention

The standard P16-603 reference DTU 64.1 dated December 1992, published and distributed by the French Standardization Association (AFNOR), entitled "Implementation of private sewage disposal equipment", describes the implementation rules relating to private sewage disposal equipment such as domestic wastewater treatment from dwellings of one to ten principal rooms. The clauses of this standard, concern the treatment systems composed of an anaerobic pretreatment septic tank and a reconstituted in-place ground spreading system or a sand filtration system.

This standard particularly specifies that sand filters must contain washed siliceous sand which is stable in water, having a size-distribution curve which conforms to a certain grading range represented in FIG. 9.

This standard also specifies that sand filters size must not be under 5 $m^2$ /equivalent inhabitant.

Dimensions of such sand filters remain large, which causes numerous drawbacks or constraints: large required ground surface, elevated cost, etc.

SUMMARY OF THE INVENTION

A filter is proposed for wastewater treatment, of a type which includes:
  an inlet for the water to be treated;
  an outlet for the treated water;
  filtration equipment between the inlet and the outlet, characterized by the fact that the filtration equipment includes:
  two pipe and tube systems, respectively for distribution and drainage, each located at the inlet and the outlet, placed mutually facing and spaced apart from each other, and containing perforations distributed lengthwise along their transverse walls;
  filtration equipment between the two systems; distribution equipment connected with the network of distribution pipes, meant to ensure the diffusion of water to be treated toward the filtration equipment.

A water tratment septic tank is proposed which includes a barrier, a delivery pipe for wastewater, an evacuation pipe for clean water towards a spreading system, equipment for decantation of the heaviest matter at the bottom of the barrier, and of surface accumulation of grease and light particles, and of at least partial liquefaction of these materials by anaerobic fermentation, protective equipment for the spreading system to prevent plugging, integrated in the barrier, characterized by the fact that the equipment of settling, liquefaction, and protection are placed in a single compartment of the barrier; the delivery pipe forms an elbow the downward-sloping section of which leads towards an inlet end wall of the barrier and the outlet of which is opened towards the top; it includes a first deflector placed in the barrier transversely, at least approximately at outlet level, vertically inclined; a vertical partition, situated partly above and partly below the free surface S, at least approximately at the base of the lower edge of a second deflector containing an inclined lower section, is associated with an evacuation pipe; the vertical partition, the second deflector and the lateral partitions define a passage for clear water, containing an inlet which is approximately vertical, an elbow, and an outlet cover connected to the evacuation pipe.

According to the first aspect, the invention concerns a filter for removing bacterial contamination of effluents, the filtration equipment of which contains:
  two systems of pipes, for distribution and drainage respectively, each one placed at the filter inlet and outlet, placed approximately facing and distanced from each other, and containing perforations distributed lengthwise in their transverse walls,
  filtration equipment placed between the two systems, in the form of at least one layer of sand the size distribution curve of which is in compliance with the range defined in AFNOR DTU no. 64-1, Ref. P 16-603, able to ensure the removal of a substantial part of the bacterial contamination of the effluent passing through the filter, and
  distribution equipment connected to the distribution pipes system, in order to ensure delivery of the water to be treated towards the filtration equipment.

According to other characteristics of the filter, it is between 0.2 and 0.9 $m^2$/equivalent inhabitant in dimension.

The distribution pipes system is adjacent to the first surface of the granular filtration layer, notably located on the outside.

The drainage pipe network is next to a second surface of the granular filtration layer, notably located in a drainage layer situated below the granular filtration layer, the filtration layer and the drainage layer being separated by a synthetic drainage mat weighing around 100 $g/m^2$.

The filter also contains a protection layer, in which is located the network of distribution pipes, and which is adjacent to the granular filtration layer.

The distribution pipes system contains at least one layer of several pipes spaced apart from each other transversely, and connected to each other especially near the inlet. The perforations in the distribution pipes system are distributed approximately perpendicular to the depth of the granular filtration layer.

The distribution pipes contain overflow openings distributed lengthwise, opposite the first surface of the granular filtration layer.

The distribution pipes are respectively covered with protective equipment—such as an overturned gutter—meant to avoid any clogging of perforations and/or overflow openings without preventing the distribution of effluents.

One of the means of distribution is in the form of a layer for the absorption and diffusion of effluents, placed between the distribution pipes system and the filtration equipment.

One of the means of distribution is in the form of bands for the absorption and diffusion of water, placed between the distribution pipes system and the filtration equipment. These bands appear in the form of a drainage layer and a fine filtration layer, successively, in the direction of flow. The distribution pipes are placed in the median part of these bands.

The drainage system contains at least one layer of several pipes, transversely spaced in relation to each other, and connected with each other especially near the filter outlet.

The filter also contains an outer casing which houses the two systems of distribution and drainage pipes respectively, the filtration equipment between the two systems, and the distribution equipment connected to the distribution network. This casing contains an inlet and an outlet. The casing is in the shape of a U the opening of which is notably closed. Such a filter may also contain a sequential effluent injection device, such as an electric pump, a rocking bucket or a siphon primed by a pressure cover.

According to the second aspect, the invention concerns a treatment facility for domestic wastewater containing from upstream to downstream:

a septic tank for all kinds of water;

a pre-filter covered with pozzolano or an equivalent material;

the first filter containing a filtration equipment of a minimum one granular filtration layer with a porosity between around 0.2 and 5 mm, ensuring the removal of a substantial part of organic matter from the effluents; and the second filter identical to the one described above.

According to other characteristics of the facility, the first and second filters present a similar or analogous general structure.

The first filter is between 0.2 and 0.9 m$^2$/equivalent inhabitant in dimension. The septic tank for all waters is between 0.2 and 1 m$^3$/equivalent per inhabitant in dimension.

The septic tank includes a barrier, a delivery pipe for liquid waste, an evacuation pipe for clear water towards the first filter, and equipment of decantation by deposit of the heaviest materials on the bottom of the barrier, and by surface accumulation of grease and light particles, and of at least partial liquefaction of these materials by anaerobic fermentation, and equipment of protection for the first and second filters, integrated in the barrier itself, to prevent their clogging.

The decantation, liquefaction, and protective equipment are located in a single compartment of the barrier. The delivery pipe forms an elbow the downhill section of which leads to the inlet edge wall of the barrier, and its outlet is opened towards the top. The septic tank contains a first deflector transversely placed in the barrier, approximately at the level of the outlet, extending over all, or most of the width of the barrier, vertically inclined at 35 to 45 degrees from the bottom to the cover, and from the inlet edge walls towards the outlet edge walls, the first deflector's function being to improve decantation and to limit the progress of turbulence to the bottom of the barrier. To the evacuation pipe is connected a vertical partition, located partly above, partly below the free surface, approximately in line with the lower edge of the second deflector. The latter contains a lower section inclined from the bottom to the cover, and from the inlet edge walls to the outlet edge walls. The vertical partition, the second deflector, and the lateral partitions create a passage for clear water, containing an approximately vertical inlet opening, an elbow, and an outlet opening connected with the evacuation pipe.

The upper section of the septic tank's delivery pipe is located at a higher level than the one of the evacuation pipe.

The barrier of the septic tank includes two identical or approximately similar parts: a lower shell and an upper shell, each having a trapezoidal shape in right transverse and longitudinal section, the two shells being connected to each other by their large common base.

The delivery pipe, the evacuation pipe, as well as the vertical partition and the second deflector are entirely located in the upper shell, which contains in its cover two inspection holes, while the first deflector is located at least partially in the upper shell and near the base.

The sizes of the first deflector, the second deflector and the vertical partition allows their passage through an inspection port.

The lower edge of the first deflector determines the upper acceptable level of accumulated sludge at the bottom of the barrier.

The exchange surface between the accumulated sludge at the bottom of the barrier and the floating liquid is approximately equal to all the surface of the barrier's horizontal section at the level of the lower edge of the first deflector or of the upper surface of sludge.

In the septic tank there is a continuous and permanent free communication between the evacuation pipe and the delivery pipe for the passage of air, due to openings designated in the upper portion of the evacuation and delivery pipes.

The first deflector, the second deflector, and the vertical partition are, besides the delivery and evacuation pipes, the only parts placed on the inside of the septic tank's barrier.

The barrier forms a single compartment, not separated in two distinct compartments by a transverse partition.

According to a third aspect, the invention concerns a domestic wastewater treatment, in which, successively:

the liquid waste to be treated is sent into an all-water septic tank;

then into a first filter which ensures removal of a substantial part of the organic matter;

then, finally, into a second filter which ensures retention of a substantial part of the bacterial contamination.

According to other characteristics, the waters leaving the second filter have:

a chemical oxygen demand less than 30 mg $O_2$/l;

a quantity of suspended solids less than 6 mg/l;

a total quantity of KJELDAHL nitrogen less than 2 mg of nitrogen per liter;

nitrite quantities equal or close to 0;

nitrate quantities less than 60 mg of nitrogen per liter;

a quantity less than 1/ml for fecal coliforms;

a quantity less than 1/ml for fecal streptococcus.

BRIEF DESCRIPTION OF THE SEVERAL VIEWS OF THE DRAWINGS

The invention will be well understood through the description which follows, in the form of a possible realization and referring to the annexed drawings, in which:

FIG. 4 is a top view of a filter for the removal of bacterial contamination of effluents according to the invention or for the removal of effluents' organic matter; this or these filters are part of the facility in FIG. 1 or are implemented in the corresponding method;

FIG. 5 is a bottom view of the filter shown in FIG. 4;

FIG. 6 is a sectional view of the filter following line A–A$^1$ of FIGS. 4 and 5;

[FIG. 9—callouts]
A. Slate
B. Lime
C. Sand
D. Fine
E. Medium
F. Large
G. Gravel
H. Fine
I. Large
J. % passing
K. % retained
L. Particle dimensions (mm)

DETAILED DESCRIPTION OF THE INVENTION

Figure 1:
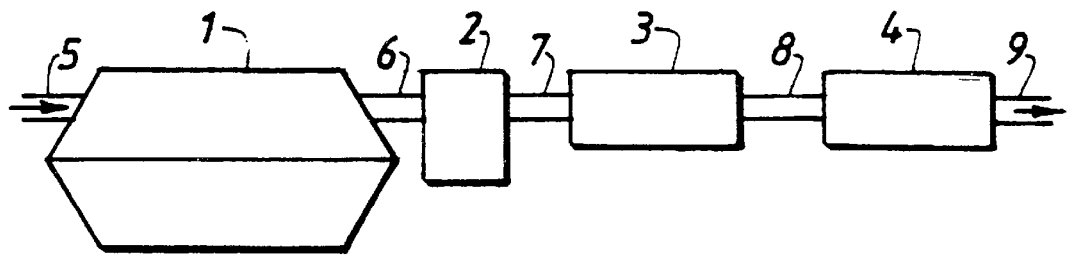
FIG. 1 is a schematic view which illustrates both the elements making up a facility and the required steps for a treatment method for domestic liquid waste according to the invention.

A facility for domestic wastewater treatment according to the invention includes, from upstream to downstream:

an all-water septic tank 1;

a pre-filter 2 covered with pouzzolano or equivalent material;

a first filter 3 containing filtration equipment in the form of at least one granular filtration layer of a porosity between about 0.2 and 5 mm, ensuring removal of a substantial part of the effluents' organic matter; and a second filter 4 for removal of the effluents' bacterial contamination.

The facility also includes:

a delivery pipe 5 for liquid waste in the septic tank 1;

a pipe 6 between the outlet of the septic tank 1 and the inlet of the pre-filter 2;

a pipe 7 between the pre-filter 2 outlet and the first filter 3 inlet;

a pipe 8 between the first filter 3 outlet and the second filter 4 inlet;

and finally, an evacuation pipe 9 at the outlet of the second filter 4.

The second filter 4 will now be more specifically described.

This filter is meant to be incorporated either in a facility as above described, or in any other facility, for which this filter 4 would be adapted.

The filter 4 contains an inlet 10 for water to be treated connected to the pipe 8, an outlet 11 of treated water connected to the pipe 9, and a filtration equipment between the inlet 10 and the outlet 11.

The filter 4 is fed with the water to be treated, through its inlet 10, through (in the represented realization) a siphon 12 which can be primed by a pressure cover located in a supply tub 12a. The siphon 12 receives the water to be treated from the first filter 3.

In the realization example considered in FIG. 4, the primable siphon 12 is located in the supply tub 12a and contained in the filter 4. The filter 4 can be separated from the siphon 12, however. The inlet of the filter thus corresponds here to the inlet 10a of the siphon 12 located in the supply tub 12a. This siphon 12 thus feeds the inlet 10 of the filter 4.

This primable siphon 12 causes the filter 4 to be supplied with water quantities to be treated. The supply no longer being continuous, the priming regulation of the siphon 12 can be done in such a way that the filter 4 only receives a quantity of water to be treated when the preceding amount has already been treated. This allows to obtain a better distribution of waters in the filter as well as a better purification.

According to other realization possibilities, the replacement of the siphon 12 with a rocking trough or an electric pump with a detector of high and low levels may be envisioned—or more generally with an injection device of the effluent, sequential or not.

In the treatment system under consideration, the filter 4 is placed approximately horizontal and at ground level. It can however be partially or completely buried.

The filtration equipment of the filter 4 contains:

two systems of pipes 13, 14 respectively for distribution and drainage, connected to the inlet 10 and the outlet 11 respectively, placed approximately facing and apart from one another, and containing perforations 15 distributed lengthwise in their transverse walls, a filtration equipment 16 placed between the two systems 13 and 14, and an equipment of distribution 17 connected to the distribution pipes system 13 and meant to ensure delivery of the water to be treated to the filtration equipment 16.

The filtration equipment 16 is in the form of a granular filtration layer. This granular filtration layer 16 is composed at least of one layer of siliceous washed sand, stable in water.

Figure 9:
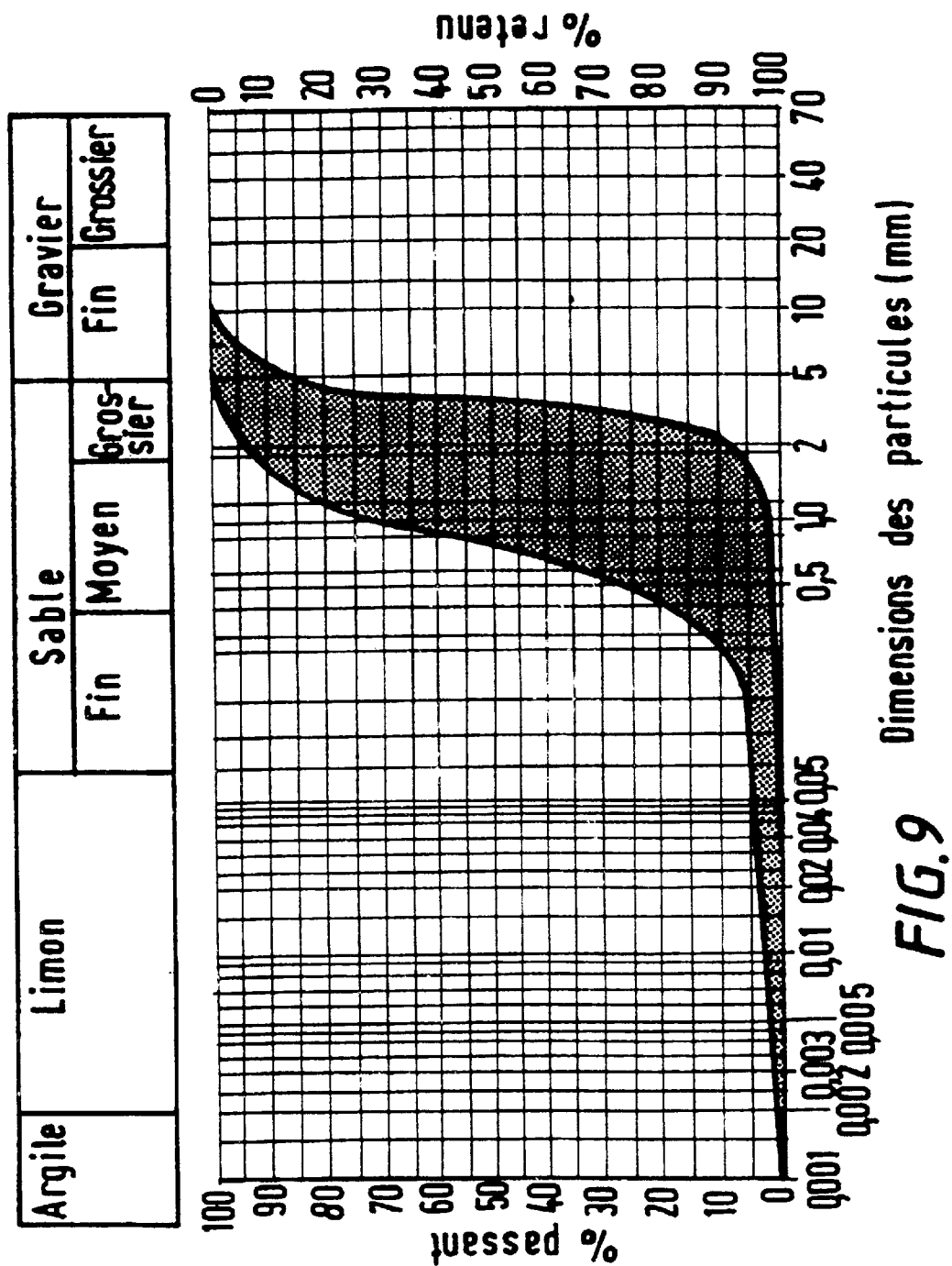
FIG. 9 is a representation of the grading range of the filter sand to be used into the sand filters, according to the standard P16-603 references DTU 64.1 of December 1992, edited and distributed by the French Standardization Association (AFNOR).

This sand has a size-distribution curve in accordance with the range represented in FIG. 9, to which one should refer specifically for this purpose.

The depth of the layer is between 0.5 and 1 m. It should be preferably equal to or around 60 cm.

The distribution pipes system 13 is adjacent to a first surface 16a of the granular filtration layer 16. It can be located outside or inside of this granular filtration layer 16.

Into the example of the considered realization represented in FIG. 6, the distribution pipes system 13 is positioned outside of the granular filtration layer 16.

In another hand, this distribution pipes system 13 contains vents which allow aeration.

Also, the drainage pipes system 14 is adjacent to a second surface 16b of the granular filtration layer 16. It can also be located either outside or inside the granular filtration layer 16. In the realization example considered in FIG. 6, the drainage pipes system 14 is placed in a drainage layer 17b located under the granular filtration layer 16, and the filtration layer and the drainage layer are separated by a synthetic drainage mat weighing about 100 g/m².

The distribution pipes system 13 contains at least one layer of several distribution pipes 13a spaced transversely in relation and connected to each other, specifically near the inlet 10 of the filter 4.

According to the form of realization represented in FIG. 4, the distribution pipes 13a are connected to each other by communication pipes 13b placed transversely in relation to the longitudinal axis 13c of the distribution pipes 13a at their ends 13d, 13e. The distribution pipes 13a are preferably made of PVC and have a diameter of about 40 mm.

The distance d between the longitudinal axes 13c of the distribution pipes 13a is preferably about 1 m.

The drainage pipes system 14 contains at least one layer of several drainage pipes 14a transversely spaced in relation and connected to each other near the outlet 11 of the filter 4.

In the realization example shown in FIG. 5, the network of drainage pipes 14 has the same configuration as the distribution pipes system 13. The drainage pipes 14a are therefore connected to each other by communication pipes 14b at the ends 14d, 14e of the drainage pipes 14a transversely in relation to the longitudinal axis 14c of the drainage pipes 14a. The communication pipes 14b located at the end 14e of the drainage pipes 14a are connected to the outlet 11 of the filter 4.

The drainage pipes 14a are also preferably made of PVC and have a diameter of about 100 mm.

The distance d separating the axes 14b of the drainage pipes 14a is here the same as in the case of the distribution pipes system 13.

The distribution equipment 17 associated with the distribution pipes system 13 is in the form of a layer of water absorption and diffusion between the distribution pipes system 13 and the filtration equipment 16, meaning the granular filtration layer 16.

In one form of the invention's realization, the distribution equipment 17 is in the form of water absorption and diffusion bands 17a, preferably around 50 cm wide, these bands 17a being situated between the distribution pipes system 13 and the filtration equipment 16.

This layer or these bands 17a of absorption and diffusion include a synthetic drainage mat weighing about 750 g/m$^2$ and can be in the form of a drainage layer 17b and a thin filtration layer 17c preferably made of polypropylene, in the direction of water diffusion.

In the realization example being considered, the distribution pipes 13a are placed in the median portion of the absorption and diffusion bands 17a.

The distribution pipes 13a contain perforations 15 distributed lengthwise in their transverse walls and arranged approximately perpendicular to the depth 16c of the granular filtration layer 16.

Figure 7:
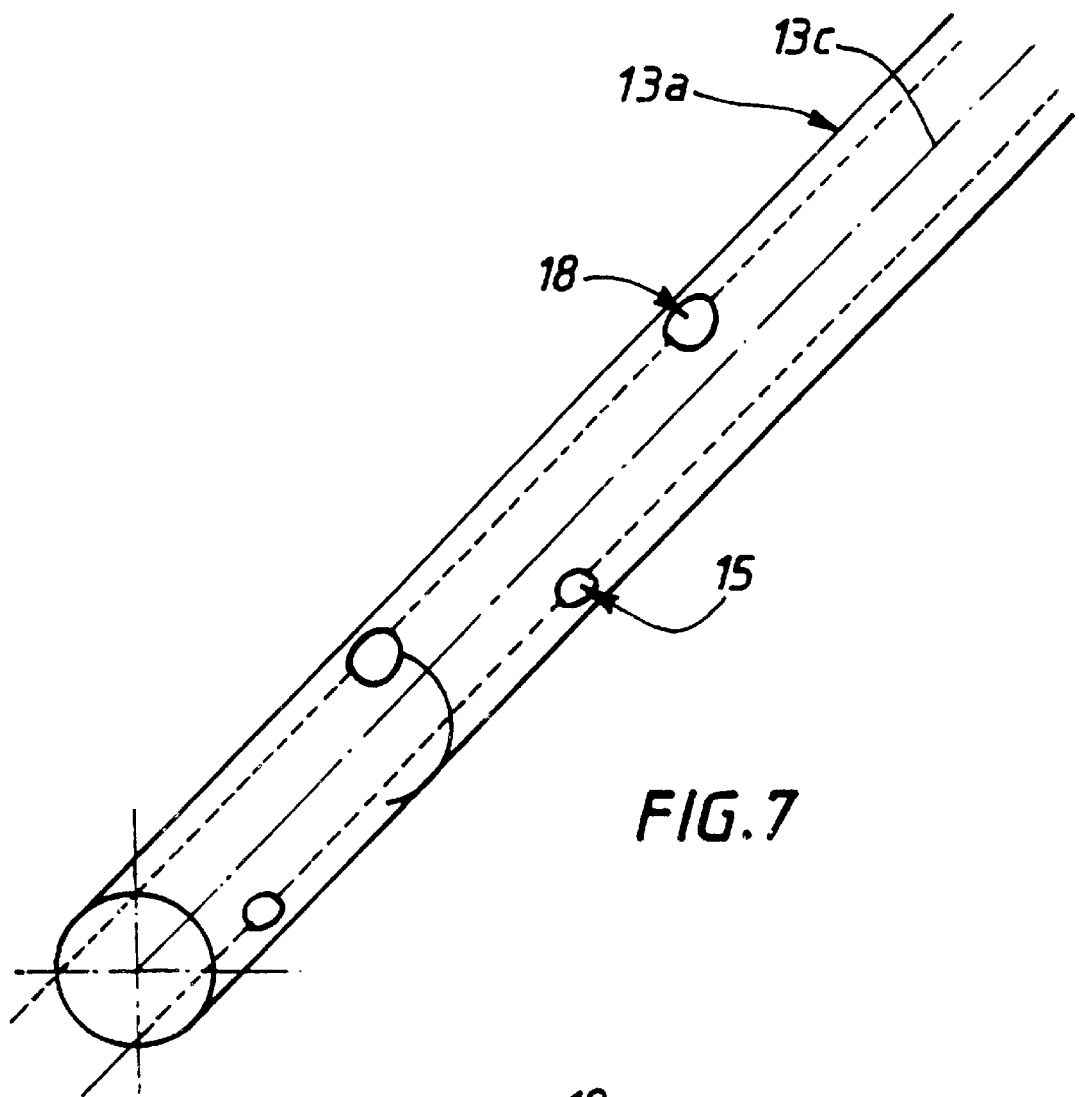
FIG. 7 is a perspective view of a distribution pipe in the distribution pipes system of a filter according to the invention.

According to FIG. 7, the perforations 15 are cylindrical with a diameter of at least 3 mm in order not to risk becoming plugged.

These perforations 15 are distributed lengthwise at intervals of about 30 cm, which allows a good distribution of water by using all of the perforations 15 present in the distribution pipes 13a.

To maintain a good distribution of water in case of a heavy flow rate, the distribution pipes 13a also contain overflow openings 18, also spaced lengthwise, but opposite to the first surface 16a of the granular filtration layer 16. These overflow openings 18 preferably have a diameter of around 10 mm and are placed in alternation with the perforations 15.

In case of heavy inlet flow rate, passage of excess water is thus made through these overflow openings 18. The entire surface of the filter 4 is thus used, no matter what the inlet flow rate.

Figure 8:
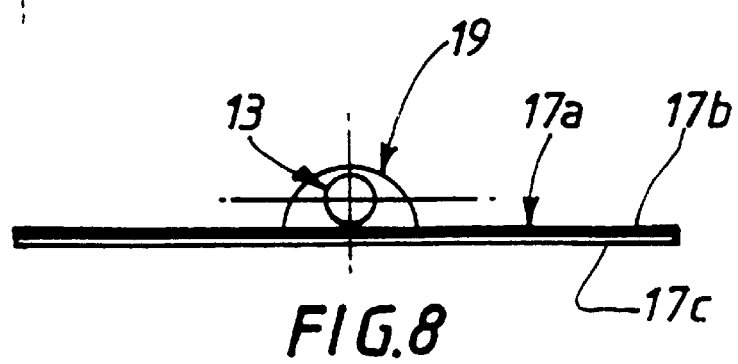
FIG. 8 is a partial sectional view of a distribution pipe covered with a protective equipment, attached to the distribution equipment.

According to one form of realization of the filter 4 according to the invention, represented in FIG. 8, the distribution pipes 13a are respectively covered with a equipment of protection 19 meant to avoid obstruction of the perforations 15 or the overflow openings 18. This equipment of protection 19 is in the form of an overturned gutter of a diameter greater than the distribution pipe 13a, thus not hampering the proper functioning of the perforations 15 and the overflow openings 18.

In the realization form shown in FIG. 8, the overturned gutters 19 have a diameter of around 100 mm.

To protect the granular filtration layer 16, it is possible to preview a protective layer 20 in which the distribution pipes system 13 is found. This protective layer 20 is adjacent to the granular filtration layer 16 at its first surface 16a and is preferably a layer of washed gravel, about 5 to 10 cm thick.

Finally, the filter 4 includes an exterior casing 21 in which the two systems of distribution 13 and drainage 14 pipes respectively are housed, as well as the filtration equipment 16 between the two systems 13 and 14 and the equipment of distribution 17 associated with the distribution pipes system 13. This casing includes the inlet 10 and the outlet 11.

In the realization example shown in FIG. 5, the casing 21 has the shape of a U, but it can also have the shape of a U the opening of which is closed.

Furthermore, according to another realization, this casing 21 can be replaced with a concrete pit with waterproof walls, realized on the spot.

The second filter 4 described above is compact, meaning that its dimensions are smaller than those recommended in actual practice.

The second filter 4 has dimensions of between 0.2 and 0.9 m$^2$/equivalent inhabitant, specifically around 0.6 m$^2$/equivalent inhabitant.

The first filter 3 may have a similar or analogous structure to the second filter 4.

According to the fact, it is also compact, its dimensions are between 0.2 and 0.9 and specifically around 0.6 m$^2$/inhabitant.

Instead and in place of sand as component material of the filtration layer, such as described in the second filter 4, the first filter 3 contains, in the realization considered here, granules of zeolite, giving a size-distribution between about 0.1 and 10 mm.

For example, this layer is made up, either entirely of granular material between 2 and 5 mm, or of two sub-layers, the upper one with 2 to 5 mm granules and the lower one with 0.2 to 2 mm granules. Due to the presence of intergranular interstices, the zeolite granules allow excellent air circulation and thus good growth of purifying microorganisms. The zeolite fixes well the purifying biomass, and thus allows a good rate of elimination of the polluting carbonized load of effluents.

In addition, the zeolite is made up of microporous grains, allowing a gravitational flow of water between the grains in case of heavy flow rate, and a capillary flow from one grain to the next, in case of light flow rate.

Finally, the zeolite possesses valuable elimination properties for nitrogenous pollution.

Furthermore, because of the growth of purifying microorganisms in the first filter 3, the bands' synthetic drainage mat progressively loses part of its permeability and progressively diffuses the water to be treated to the granular filter bed 16, improving the distribution of water at the surface.

We will now describe more specifically a particular form of realization of the septic tank 1, the performance of which has been recorded, along with the pre-filter 2 and the two successive filters 3 and 4.

The septic tank 1 includes a rigid barrier 22; a delivery pipe 5 for wastewater; and an evacuation pipe 6 to the pre-filter 2.

The septic tank 1 also includes an equipment 23 of settling of the heaviest matter or sludge B by deposit at the bottom 24 of the barrier 22 and of accumulation of grease and light particles G at the free surface S; and of at least partial liquefaction of these materials B, G by anaerobic fermentation.

The septic tank 1 finally includes equipment of protection 19 of the part of the facility placed further down (pre-filter 2, filters 3 and 4), integrated in the barrier 1, in order to prevent blockage.

The equipment 23 of decantation and liquefaction, and the equipment 19 of protection are placed in a single area of the barrier 22.

The barrier 22 includes two identical or approximately similar parts, made up of a lower shell 25a and an upper shell 25b. Each shell 25a and 25b has, in its right longitudinal and right transverse section, a generally trapezoidal isosceles form. The two shells 25a, 25b are connected to each other at their large open common base 26.

The lower shell 25a includes, besides the bottom 24 which makes a small base, two edge walls of intake 27a and outlet 28a and two lateral walls 29a, 30a, all inclined at about a 30° angle from the vertical.

The upper shell 25b includes an upper cover 31 forming a small base which is flat and horizontal, two edge walls of intake 27b and outlet 28b and two lateral walls 29b, 30b. The edge 27b, 28b and lateral 29b, 30b walls are inclined from the vertical in the same way as the edge 27a, 28a and lateral 29a, 30a walls. The walls 27b, 28b, 29b, 30b of the shell 25b are connected to the walls 27a, 28a, 29a, 30a and the shell 25a at the base 26. The base 26 is thus located halfway between the bottom 24 and the cover 31.

On the cover 31, space will be allowed for two inspection windows 32 closed by covers 33. The inspection windows 32 are placed at the two edges of the cover 31 near the edge walls 27b, 28b.

The delivery pipe 5 forms a double bend folded on itself, including an upstream horizontal section 34, an intermediate vertical section 35 and a downstream section 36, also horizontal.

The upstram section 34 crosses the intake edge wall 27b near the cover 31. The downstream section 36 leads overall toward the edge wall 27a, 27b of the barrier 22 in such a way that the effluents coming from the delivery pipe 5 are directed to this wall.

Figure 2:
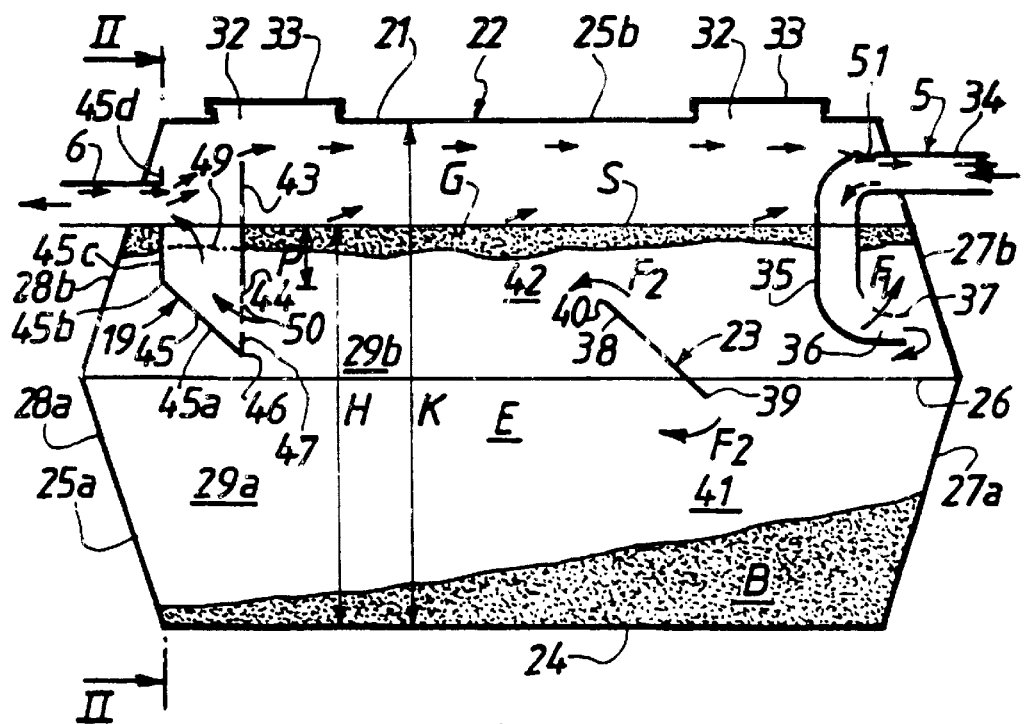
FIG. 2 is a schematic view in vertical and longitudinal section of a septic tank according to the invention's facility and method.

The outlet 37 of the downstream section 36 is cut in the form of a gutter so as to be open toward the top, so that the effluents are also directed toward the top in the direction of the arrows F1 (FIG. 2).

The septic tank 1 also contains a first deflector 38 placed transversely in the barrier 22, at least approximately at the level of the outlet 37, and partially constituting the equipment 23. The first deflector 38 stretches over all or at least a substantial part of the width of the barrier 22, meaning between the lateral walls 29a, 29b on the one hand and 30a, 30b on the other. The function of the first deflector 38 is to improve decantation and to limit the progression of turbulence toward the bottom 24 of the barrier 22. This process induces a water circulation according to the arrows F2 (FIG. 2). In one form of realization, the first deflector 38 is especially inclined 35° to 55° from the vertical, and particularly around 45_, from the bottom 24 to the cover 31 and from the intake edge walls 27a, 27b to the outlet edge walls 28a, 28b.

If H is representing the water depth in the barrier, this depth being defined by the position of the evacuation pipe 6, as one will see later, the center of the first deflector 38 is located between 0.65 H and 0.75 H and particularly at around 0.70 H from the bottom 24.

The lower edge 39 of the first deflector 38 is located between 0.5 H and 0.6 H and particularly at around 0.55 H from the bottom 24. The upper edge 40 of the first deflector 38 is located between 0.75 H and 0.85 H and particularly around 0.80 H from the bottom 24.

In the form of realization shown in FIG. 2, the first deflector 38 is located at about one-third of the length of the barrier 22 (i.e. between the edge walls 27a, 27b and 28a, 28b) starting from the intake edge walls 27a, 27b. More generally, and taking into account a total possible volume of the upper septic tank, it is preferable the first deflector 38 is not positionned too far from the edge walls 27a, 27b. For this reason, the first deflector 38 is usually located at a distance equal to or around 5.5 to 7.7 times and preferably around 6 to 7 times the diameter of the delivery pipe 5 from the junction of the two walls 27a, 27b. Or, as a variant, this distance is equal to or around 0.6 H.

The first deflector 38 thus defined leaves a large lower passage 41 between its lower edge 39 and the bottom 24, on the one hand, and a smaller upper passage 42 between its upper edge 40 and the free surface S, on the other. The lower passage 41 allows transit of heavy matter or sludge B, while the upper passage 42 allows passage of grease and light particles G.

The first deflector 38 can be fixed to the lateral walls 29a, 29b, 30a, 30b of the barrier 22 at its two lateral edges.

The evacuation pipe 6 placed horizontally defines the level of the free surface S. The horizontal upper section 34 of the delivery pipe 5 is located above the free surface S, in order to avoid any backflow of effluents through the delivery pipe 5.

The free surface S is located at a distance H from the bottom 24 which is around 0.7 to 0.9 K and preferably equal to or about 0.8 K, K being the distance between the bottom 24 and the cover 31.

A vertical partition 43 is associated with the evacuation pipe 6 and is located partly above and partly below the free surface S. For example, the lower edge 44 of the vertical partition 43 is located between 0.10 H and 0.20 H and particularly is equal to or near 0.15 H from the free surface S. The free surface S is itself located approximately at mid-height of the partition 43.

A second deflector 45 is also associated with the evacuation pipe 6, containing a lower section 45a inclined from the bottom 24 to the cover 31 from the edge walls 27a, 27b to the edge walls 28a, 28b.

The vertical partition 43 is located at least approximately at the base of the lower edge 46 of the second deflector 45. The vertical partition 43 and the second deflector 45 define a passage 47 for clear water. This passage 47 includes, at least approximately vertical, an intake opening limited by the lower edges 44, 46 of the partition 43 and the second deflector 45, then a bend bounded by the lower section 45a to deny the passage of floating matter, then an outlet opening in a vertical section connected to the evacuation pipe 6. Lateral edge partitions 48 (FIG. 3) rigidly connect the vertical partition 43 and the second deflector 45. These vertical lateral partitions 48 have a trapezoidal form, the small base of which corresponds with the upper section 45b. Its large base is at a distance between the upper edge of the partition 43 and the lower edge 46 of the deflector 45, and the width of which is the distance between the partition 43 and the upper section 45c. The partitions 48 in combination with the partition 43 and the second deflector 45 form a sort of box in which water cannot enter except through the passage 47.

A screen 49 is horizontally placed in the passage 47 near the outlet, under the free surface S. Its position is such that it is easily accessible from the inspection window 32 placed at the base. It is mounted to be removable.

Another vertical screen 50, for extra protection, is placed in the passage 47 at the intake, lengthening the partition 43 toward the bottom to the edge 46. The debris stopped by the screen 50 can settle or freely float as soon as the stream in the septic tank stops.

Figure 3:
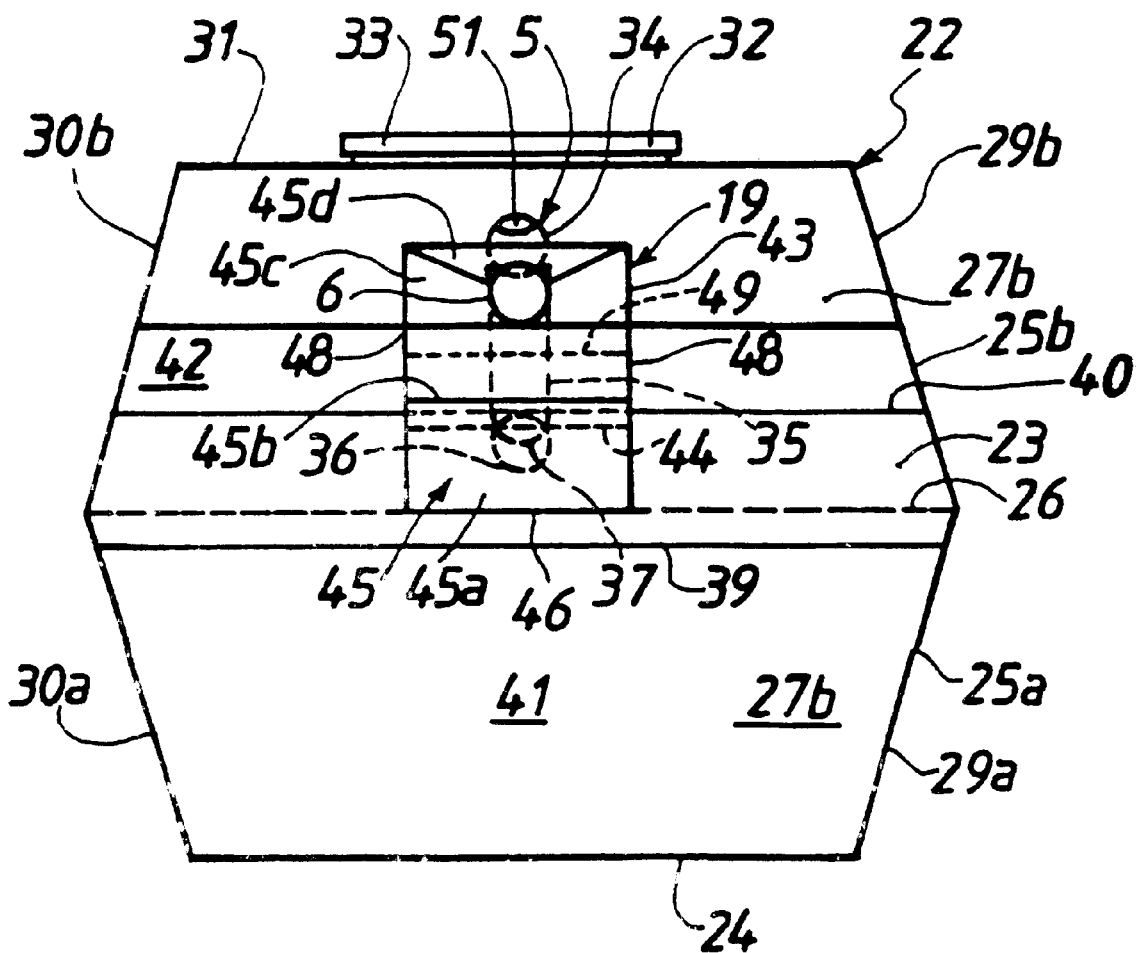
FIG. 3 is a schematic view in transverse and vertical section according to line 33 of FIG. 2.

The vertical partition 43 and the second deflector 45 have an identical or similar width which can be limited to around 2.5 to 6 times and especially to around 4 times the diameter of the evacuation pipe 6 (FIG. 3).

The distance between the lower free edges 44, 46 of the partition 43 and the second deflector 45, i.e., the height of the intake opening of the passage 47, can be between 0.9 P and 1.1 P and particularly equal or near P, P being the submerged depth of the vertical partition 43. This distance can also be between around 0.10 H and 0.20 H, and particularly be equal or near 0.15 H.

The lower free edge 44 of the partition 43 is located approximately at the same level as a barrier 45*b* separating the lower section 45*a* of the second deflector 45 from an upper section 45*c* which is at least approximately vertical and connected to the evacuation pipe 6 and even projecting above the latter, in a section 45*d*.

The distance between the upper section 45*c* and the vertical partition 43 can be around the same size as the height of the intake opening of the passage 47, especially between around 1 and 1.5 P or equal to or about 0.2 H.

The delivery pipe 5 and the evacuation pipe 6, as well as the vertical partition 43 and the second deflector 45 are completely located in the upper shell 25*b* and the first deflector 38 is situated at least partially in the upper shell 25*b* and near the base 26.

The first deflector 38, the second deflector 45, and the partition 43 are of a limited size allowing their passage through the observation port 32. The lower edge 39 of the first deflector 38 determines the admissible upper level for the sludge accumulated on the bottom 24 of the barrier 22.

The exchange surface between the sludge B accumulated on the bottom 24 of the barrier 22 and the floating liquid E is approximately equal to the total surface of the horizontal section of the barrier 22 at the level of the lower edge 39 of the first deflector 38 or at the level of the upper surface of sludge B.

An opening 51 drilled through the upper part of the delivery pipe 5 allows a free, continuous and permanent communication for the air passage necessary to the functioning of the all-water septic tank, from the evacuation pipe 6 which is not immersed into the liquid contained in the tank and the delivery pipe 5.

The first deflector 38, the second deflector 45 and the vertical partition 43 are, besides the delivery and evacuation pipes 5, 6, the only mechanisms located inside the barrier 22. The barrier 22 thus forms a sole compartment not separated into two totally distinct compartments by a vertical partition 43.

What is claimed is:

1. A treatment method for domestic wastewater in which, successively:

wastewater to be treated is passed into an all-water septic tank;

then into a first filter able to ensure the removal of a substantial portion of organic matter;

and finally into a second filter able to ensure the removal of a substantial portion of bacterial contamination in which the water leaving the second filter has the following bacterial levels, per ml:

a quantity less than 1 for fecal coliforms;

a quantity less than 1 for fecal streptococcus.

2. A filter for the removal of bacterial contamination of effluents with filtration equipment including two systems of pipes, one each respectively for distribution and drainage, located respectively at an intake and an outlet of the filter, placed mutually facing and spaced apart from each other, and containing perforations distributed lengthwise along transverse walls of said pipes;

a filtration equipment between the two systems in the form of at least one sand bed the size distribution curve of which conforms to the range defined in AFNOR's DTU no. 64-1, Ref. P 16-603, able to ensure the removal of a substantial portion of bacterial contamination from the effluent passing through the filter and a distribution equipment connected with the system of distribution pipes, meant to ensure the diffusion of water to be treated toward the filtration equipment and characterized by its size between 0.2 and 0.9 $m^2$/equivalent inhabitant.

3. A filter defined by claim 2, characterized by the fact that the network of distribution pipes is adjacent to a first surface of the granular filter bed.

4. A filter as defined claim 2, characterized by the fact that the network of distribution pipes is placed at the exterior of the granular filter bed.

5. A filter as defined by claim 2, characterized by the fact that the network of drainage pipes is adjacent to a second surface of the granular filter bed.

6. A filter as defined by claim 2, characterized by the fact that the network of drainage pipes is placed in a drainage bed located under the granular filter bed, the filter bed and the drainage bed being separated by a geotextile whose base weight is around 100 $g/m^2$.

7. A filter according to claim 2, characterized by the fact that it also contains a layer of protection in which is located the network of distribution pipes and which is adjacent to the granular filter bed.

8. A filter as defined in claim 2, characterized by the fact that the network of distribution pipes includes at least one layer of several pipes spaced transversely and connected to each other notably near the intake.

9. A filter defined in claim 2, characterized by the fact that the perforations in the network of distribution pipes are arranged approximately perpendicular to the thickness of the granular filter bed.

10. A filter as defined in claim 2, characterized by the fact that the distribution pipes additionally contain overflow orifices spaced longitudinally, opposite the first surface of the granular filter bed.

11. A filter as defined in claim 2, characterized by the fact that the distribution pipes are respectively covered by a means for protection designed to avoid the obstruction of the perforations and the overflow orifices without preventing the distribution of effluents.

12. A filter as defined in claim 11, characterized by an equipment of protection comprising an overturned gutter.

13. A filter as defined in claim 2, characterized by the fact that the means for distribution are in the form of a layer of absorption and diffusion of effluents between the network of distribution pipes and the filtration means.

14. A filter as defined in claim 2, characterized by the fact that the means for distribution are in the form of bands of water absorption and diffusion between the network of distribution pipes and the filtration means.

15. A filter as defined in claim 14, characterized by bands of water absorption and diffusion presenting themselves in the direction of water flow, in the form of a drainage layer and a fine filter layer successively.

16. A filter as defined in claim 14, characterized by the fact that the distribution pipes are placed in the median part of the absorption and diffusion bands.

17. A filter as defined in claim 2, characterized by the fact that the network of drainage pipes includes at least one layer of several pipes transversely spaced apart from and connected to each other, notably near the filter outlet.

18. A filter as defined in claim 2, characterized in that it additionally includes an exterior casing in which are housed the two networks of distribution and drainage respectively, the filtration means between the two networks, and the distribution means connected to the distribution network, this casing comprising an intake and an outlet.

19. A filter as defined in claim 18, characterized by the casing being in the shape of a U.

20. A filter as defined in claim 19, characterized by the casing being in the form of a U with a closed opening.

21. A filter defined in claim 2, characterized by the fact that the filter additionally comprises a sequential effluent injection instrument such as an electric pump, a tipping bucket, and a siphon primed by a pressure barrel.

22. A treatment method for domestic wastewater in which, successively:

wastewater to be treated is passed into an all-water septic tank;

then into a first filter able to ensure the removal of a substantial portion of organic matter;

and finally into a second filter able to ensure the removal of a substantial portion of bacterial contamination in which the water leaving the second filter has:

a chemical oxygen demand less than 30 mg $O_2$/l;

a quantity of suspension particles less than 6 mg/l;

a total quantity of KJELDHAL nitrogen less than 2 mg of nitrogen per liter;

nitrite quantities equal to or near 0;

nitrate quantities less than 60 mg of nitrogen per liter.

23. A plant for treatment of domestic wastewater comprising from top to bottom:

an all-water septic tank;

a pre-filter covered in one of pozzolano and an equivalent material;

a first filter including means of filtration in the form of at least one granular filter bed of a porosity between 0.2 and 5 mm, able to ensure removal of a substantial portion of organic matter of effluents;

a second filter as defined in claim 2; and further characterized by the fact that the means for settling and liquefaction and the means for protection comprised by the septic tank are placed in a single compartment of the enclosure; the conduction pipe forms a double bend whose downward-sloping section leads overall to the wall of the enclosure so that the effluents are directed to this wall, and whose outlet is open equally toward the top so that the effluents are also directed upwards; the septic tank contains a first deflector placed transversely in the enclosure, at least approximately near the outlet, reaching across all or at least a substantial portion of the length of the enclosure, notably inclined at 35 to 45 degrees from the vertical from the bottom to the cover and from the edge walls to the edge walls, the first deflector's function being to improve settling and to limit the progression of turbulence toward the bottom of the enclosure; a vertical partition located partly above, partly below the free surface at least approximately at the base of the lower edge of the second deflector, on the one hand, and a second deflector including a lower section inclined from the bottom to the cover and from the edge walls to the edge walls, on the other, are connected to the evacuation pipe; the vertical partition and the second deflector and the lateral partitions define a passage for clear water, including an intake opening at least approximately vertical, bounded by the lower free edges of the partition and of the second deflector, then a bend bounded by the lower section of the deflector to prevent the passage of floating matter, then an outlet opening connected with the evacuation pipe.

24. A plant for treatment of domestic wastewater comprising from top to bottom:

an all-water septic tank;

a pre-filter covered in one of pozzolano and an equivalent material;

a first filter including means of filtration in the form of at least one granular filter bed of a porosity between 0.2 and 5 mm, able to ensure removal of a substantial portion of organic matter of effluents;

a second filter as defined in claim 2; and further characterized by the fact that the all-water septic tank is sized between 0.2 and 1 $m^3$/equivalent per inhabitant.

25. A plant for treatment of domestic wastewater comprising from top to bottom:

an all-water septic tank;

a pre-filter covered in one of pozzolano and an equivalent material;

a first filter including means of filtration in the form of at least one granular filter bed of a porosity between 0.2 and 5 mm, able to ensure removal of a substantial portion of organic matter of effluents;

a second filter as defined in claim 2; and further characterized by the fact that the first filter is sized between 0.2 and 0.9 $m^2$/equivalent inhabitant.

26. A plant as defined in claim 25, wherein the septic tank includes an enclosure, a conduction pipe for wastewater, an evacuation pipe for clear water to the first filter and means for settling of the heaviest matter by deposit at the bottom of the enclosure and of surface accumulation of grease and light particles, and of at least partial liquefaction of these materials by anaerobic fermentation, and means for protection of the first and the second filters to prevent their obstruction, integrated into the enclosure.

27. A plant as defined in claim 25, wherein the barrier forming a single compartment is not separated into two distinct compartments by a vertical partition.

28. A plant as defined in claim 25, wherein the septic tank, the upward section of the delivery pipe is situated at a higher level than that of the evacuation pipe.

29. A plant as defined in claim 25, wherein in the septic tank, the barrier includes two parts which are identical and approximately similar to each other: having a lower shell and an upper shell, each having in right transverse and longitudinal section a trapezoidal form, the two shells being attached to each other at the level of their large common base.

30. A plant as defined in claim 25, wherein in the septic tank, the delivery pipe, the evacuation pipe, the vertical partition and the second deflector are completely situated in the upper shell which has two inspection windows on its cover, while the first deflector is situated at least partly in the upper shell and near the base.

31. A plant as defined in claim 25, wherein in the septic tank, the first deflector, the second deflector and the vertical partition have a bulk allowing their passage through an observation port.

32. A plant as defined in claim 25, wherein in the septic tank lower edge of the first deflector determines the admissible upper level of sludge accumulated at the bottom of the barrier.

33. A plant as defined in claim 25, wherein in the septic tank, the exchange surface between the sludge accumulated at the bottom of the barrier and the floating liquid is approximately equal to the total surface of the horizontal section of the barrier at the level of the lower edge of the first deflector and the upper surface of the sludge.

34. A plant as defined in claim 25, wherein in the septic tank has a continuous and permanent free communication for air passage between the evacuation pipe and the delivery pipe due to openings designed to be in the upper part of the evacuation and the delivery pipes.

35. A plant as defined in claim 25, wherein in the septic tank, the first deflector, the second deflector and the vertical partition are, apart from the delivery and evacuation pipes, the only mechanisms placed inside the barrier.

* * * * *